United States Patent
Tomioka et al.

(10) Patent No.: US 12,502,989 B2
(45) Date of Patent: Dec. 23, 2025

(54) ELECTRIC MOTOR VEHICLE

(71) Applicant: TOYOTA JIDOSHA KABUSHIKI KAISHA, Toyota (JP)

(72) Inventors: Takuya Tomioka, Toyota (JP); Keisuke Kondoh, Okazaki (JP); Takamitsu Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 677 days.

(21) Appl. No.: 17/898,801

(22) Filed: Aug. 30, 2022

(65) Prior Publication Data
US 2023/0063958 A1 Mar. 2, 2023

(30) Foreign Application Priority Data
Sep. 1, 2021 (JP) ................................. 2021-142690

(51) Int. Cl.
*B60L 53/16* (2019.01)
*B60S 1/50* (2006.01)

(52) U.S. Cl.
CPC ................. *B60L 53/16* (2019.02); *B60S 1/50* (2013.01)

(58) Field of Classification Search
CPC ........... B60L 53/30; B60L 53/31; B60L 53/16
USPC ....................................................... 280/830
See application file for complete search history.

(56) References Cited

U.S. PATENT DOCUMENTS

| 8,350,526 B2 * | 1/2013 | Dyer | B60L 55/00 320/109 |
| 10,513,197 B1 * | 12/2019 | Carpenter | B60Q 1/2661 |
| 2008/0029322 A1 * | 2/2008 | Oba | B62D 25/12 180/84 |
| 2008/0314141 A1 * | 12/2008 | Keith | G01F 23/04 73/290 R |
| 2019/0341661 A1 * | 11/2019 | Guerra | B60L 53/16 |
| 2020/0227796 A1 * | 7/2020 | Miki | H01M 10/6556 |

FOREIGN PATENT DOCUMENTS

| JP | 2006-281861 A | 10/2006 |
| JP | 2019-084973 A | 6/2019 |

OTHER PUBLICATIONS

Translation (JP 2007023782) merged with original. Paragraphs added for ease of citation (Year: 2025).*

* cited by examiner

*Primary Examiner* — John Olszewski
*Assistant Examiner* — Nathaniel William Watkins
(74) *Attorney, Agent, or Firm* — Dinsmore & Shohl LLP

(57) ABSTRACT

An electric motor vehicle comprises a charging port which is opened in a vehicle side portion and opened/closed by a charging lid, a charging inlet which is arranged inside the charging port and has a connection unit connectable to an outside power source, and on-vehicle liquid tank which is arranged in the vicinity of the charging port and provided with liquid level indication of the stored liquid amount. The charging port has therein check hole which is opened to check the liquid level indication.

2 Claims, 9 Drawing Sheets

ELECTRIC MOTOR VEHICLE

CROSS REFERENCE TO RELATED APPLICATION

This application claims priority to Japanese Patent Application No. 2021-142690 filed on Sep. 1, 2021, which is incorporated herein by reference in its entirety including the specification, claims, drawings, and abstract.

TECHNICAL FIELD

The present disclosure relates to an electric motor vehicle, and particularly to reduction of a burden on a worker who performs inspection of an amount of liquid in an on-vehicle liquid tank.

BACKGROUND

Japanese Patent Application Publication No. JP 2019-84973A discloses a charging port device provided with a charging port, which is opened in a side portion of an electric motor vehicle and opened/closed by a charging lid, and a charging inlet which is arranged inside the charging port and has a connection unit connectable to an outside power source.

Business operators that operate electric motor vehicles, such as an electric car, for passenger bus business or the like are sometimes required, pursuant to the provisions of statutes or the like, to inspect an amount of liquid within an on-vehicle liquid tank such as a cooling liquid reserve tank before operating the electric motor vehicles on each business day.

Moreover, it is general practice that the business operators perform charging of the battery before starting the operation of the electric motor vehicles on each business day. Therefore, a worker who inspects the liquid amount often performs both of the liquid amount inspection work and the charging work before the electric motor vehicles are operated. However, approaching of the on-vehicle liquid tank and the charging port was not conventionally considered, so that they were often greatly separated from each other because of a positional relation and other factors of their parts for connection of the on-vehicle liquid tank and the charging port. In addition, since the on-vehicle liquid tank is arranged in an equipment arrangement space such as a power supply source chamber inside the vehicle, in order to check the liquid amount, the worker needs to remove a closing member, which is provided within the vehicle cabin, to close an opening communicating with the equipment arrangement space, and then checks a liquid-level indication on the on-vehicle liquid tank through the opening. Therefore, in a case where the worker performs both the liquid amount inspection work and the charging work, the worker has to move between the on-vehicle liquid tank and the charging port. Accordingly, a burden on the worker is large. Also, when a liquid level indication on the on-vehicle liquid tank is checked through the opening communicating with the equipment arrangement space after removing the closing member, labor and time are required to inspect the amount of liquid in the on-vehicle liquid tank. Especially, when the electric motor vehicle is large, the tank position and the charging port position are often separated by a greater distance, and the burden on the worker is increased further.

SUMMARY

The present disclosure aims to reduce a burden on a worker who works to inspect an amount of liquid in an on-vehicle liquid tank.

The electric motor vehicle according to the present disclosure is an electric motor vehicle comprising a charging port which is opened in a vehicle side portion and opened/closed by a charging lid; a charging inlet which is arranged inside the charging port and has a connection unit connectable to an outside power source; and on-vehicle liquid tank which is arranged in the vicinity of the charging port and provided with a liquid level indication of the stored liquid amount, wherein the charging port has therein check hole which is opened to check the liquid level indication.

According to the above electric motor vehicle, when an inspection worker opens the charging lid to perform charging, the worker can use the check hole which is opened in the charging port to check the liquid level indication provided on the on-vehicle liquid tank. Accordingly, the burden on the inspection worker can be reduced, because the charging work and the liquid amount inspection work can be easily performed at the same time.

In the electric motor vehicle according to the present disclosure, the check hole may be opened inside the charging port as a part of an unobstructed-view passage which leads the liquid level indication to the charging port.

According to the above configuration, when the inspection worker opens the charging lid to perform charging, the worker can check the liquid level indication by merely seeing the liquid level indication on the on-vehicle liquid tank through the check hole which is opened in the charging port. Accordingly, the burden on the inspection worker can be reduced further.

In the electric motor vehicle according to the present disclosure, the on-vehicle liquid tank is an on-vehicle liquid tank with a gauge pipe which is arranged below the charging port and accommodates a level gauge having the liquid level indication, and it may be configured such that an upper end of the gauge pipe, which is led out to the upper side of the on-vehicle liquid tank with the gauge pipe, is pulled out to the check hole.

According to the above configuration, the on-vehicle liquid tank is arranged below the charging port, so that even if an opening is formed in the charging port, the liquid level indication can be checked by pulling out the level gauge from inside the upper end of the gauge pipe which is pulled out from inside the check hole opened inside the charging port if it is hard to check the outer surface of the on-vehicle liquid tank through the opening. Accordingly, a degree of freedom in arrangement of the on-vehicle liquid tank can be improved.

According to the electric motor vehicle of the present disclosure, a burden on a worker who performs inspection work of the liquid amount in the on-vehicle liquid tank can be reduced.

BRIEF DESCRIPTION OF THE DRAWINGS

Embodiments of the present disclosure will be described based on the following figures, wherein.

DESCRIPTION OF EXEMPLARY EMBODIMENTS

An electric motor vehicle of embodiments will be described below with reference to the drawings. In this disclosure, specific shapes, arrangement positions, amounts, and the like are examples to facilitate understanding of the present disclosure and can be changed appropriately according to the specifications of the electric motor vehicle.

Figure 1:
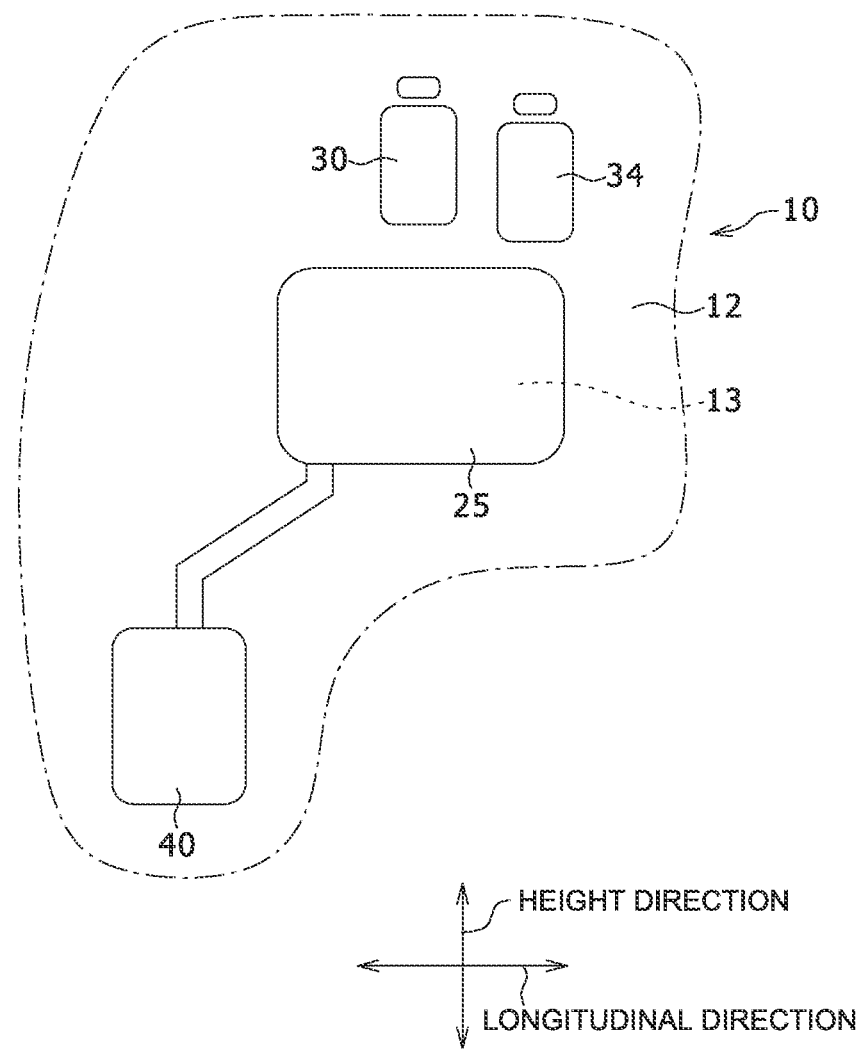
FIG. 1 is a schematic arrangement view of a charging lid and a plurality of on-vehicle liquid tanks which are seen through from outside of a side portion at one end in vehicle width direction of an electric motor vehicle according to an embodiment of the present disclosure.
Figure 2:
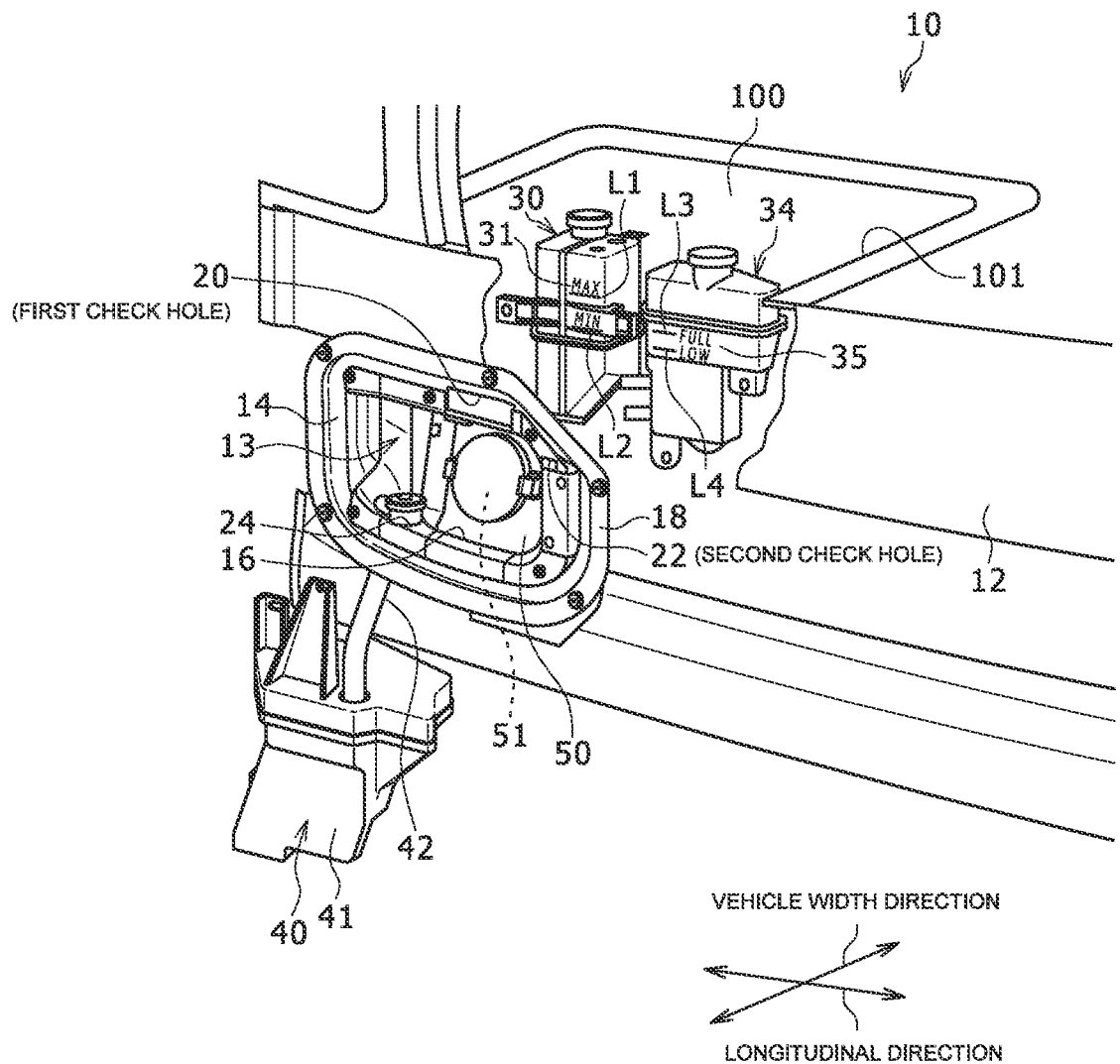
FIG. 2 is a perspective view showing the side portion of the electric motor vehicle of the embodiment as seen from outside while omitting the charging lid and other parts.
Figure 3:
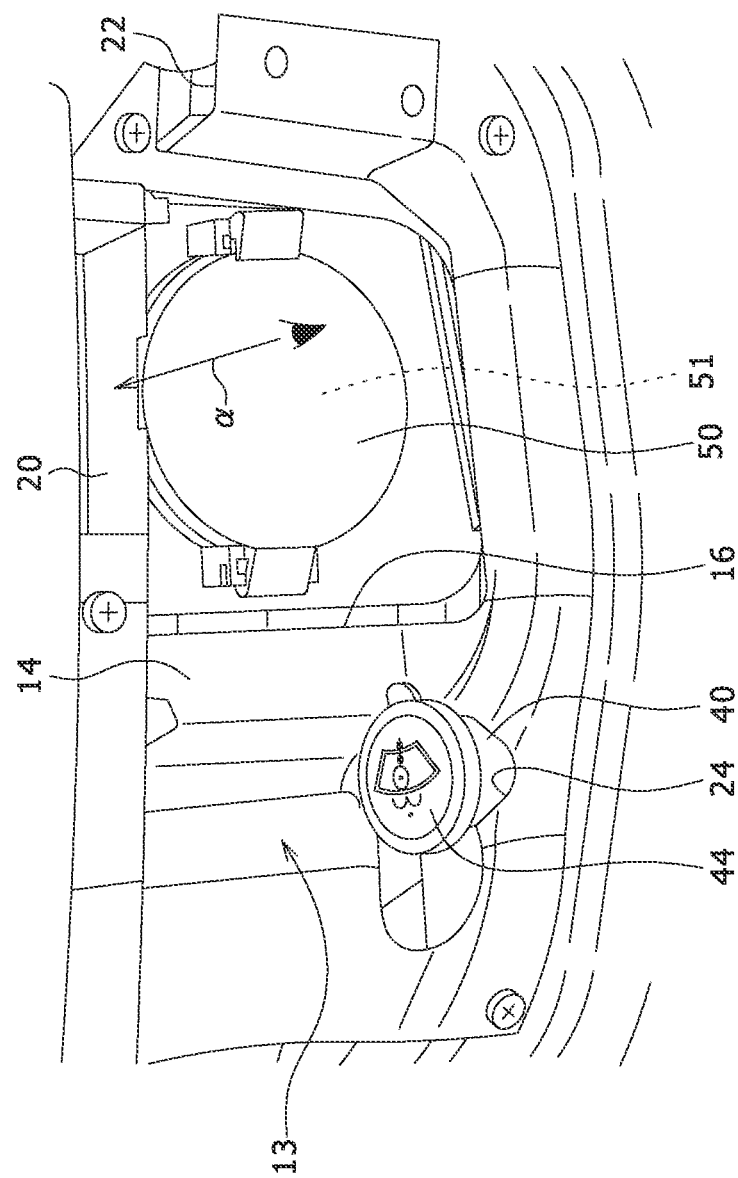
FIG. 3 is an enlarged perspective view showing a state of a charging port seen from outside with the charging lid removed from FIG. 2.
Figure 4:
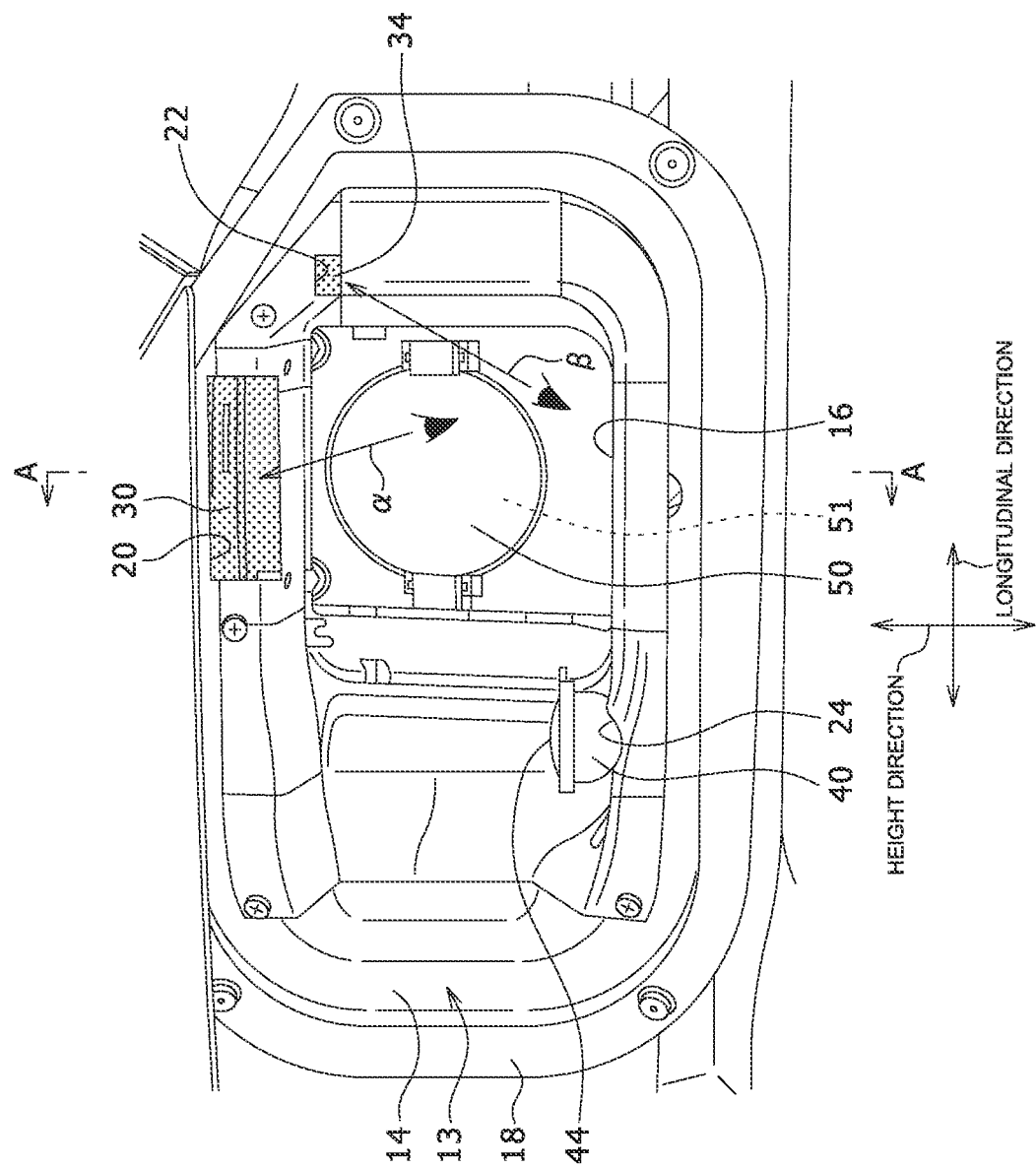
FIG. 4 is a view showing a state that the charging port shown in FIG. 3 is seen in a inward direction from outside along the vehicle width direction.

FIG. 1 is a schematic arrangement view showing a charging lid 25 and a plurality of on-vehicle liquid tanks 30, 34, 40 which are seen from outside of a side portion 12 at one end in a vehicle width direction seen through an electric motor vehicle 10 according to an embodiment. FIG. 2 is a perspective view showing the side portion 12 of the electric motor vehicle 10 which is seen from outside while omitting some parts. FIG. 3 is an enlarged perspective view of FIG. 2 showing a state that a charging port 13 is seen from outside. FIG. 4 shows a state that the charging port 13 is seen in the inward direction from outside along the vehicle width direction. The electric motor vehicle 10 is a large vehicle such as a commercial bus in which a plurality of passengers can be onboard. Wheels of the electric motor vehicle 10 are driven by running motors (not shown). The electric motor vehicle 10 is mounted with a battery (not shown) for supplying electric power to the running motors. In order to enable charging of the battery from outside, the side portion 12 of the electric motor vehicle 10 is provided with the charging port 13 for charging the battery from an outside power source (not shown).

As shown in FIG. 2 through FIG. 4, the charging port 13 is opened in the side portion 12 of the electric motor vehicle 10 and opened/closed by the charging lid 25 omitted in the figures. The charging port 13 is formed of, for example, a metal sheet, resin, or the like into a nearly box shape having a housing portion 14. The housing portion 14 is opened at an outside end in the vehicle width direction and closed by the charging lid 25. A substantially rectangular through hole 16 where a charging inlet 50 is arranged is formed in the housing portion 14. And, the open end of the charging port 13 is formed to have a flange 18 for fixing the housing portion 14 to the vehicle body. The flange 18 is screw-connected to a panel member or the like fixed to the vehicle body.

The charging lid 25 is pivotably supported relative to the vehicle body via a hinge which is fixed to the vehicle body, and opens/closes the housing portion 14 of the charging port 13. To charge the battery from an outside power source, the charging lid 25 is opened by a user such as an inspection worker who operates a lid-opening operating portion provided within the vehicle cabin or the like. The charging port 13 includes therein a connection unit 51 of the charging inlet 50 which is connectable to the outside power source through the through hole 16. A charging circuit (not shown) for battery charging is connected to the connection unit 51. When a charging plug to be connected to the outside power source is connected to the connection unit 51 of the charging inlet 50, the outside power source and the charging circuit are connected, and it becomes possible to charge the battery from outside.

Within an equipment arrangement space 100 provided inside the side portion 12 of the vehicle as shown in FIG. 2, the first on-vehicle liquid tank 30, the second on-vehicle liquid tank 34 and the on-vehicle liquid tank 40 with a gauge pipe are arranged in the vicinity of the charging port 13. The on-vehicle liquid tanks 30, 34, 40 are respectively provided with liquid level indications 31, 35, 47 (FIG. 9) for inspection of the stored liquid amounts. In addition, check holes 20, 22, 24 for checking the liquid level indications 31, 35, 47 are opened inside the charging port 13. First, the first on-vehicle liquid tank 30, the second on-vehicle liquid tank 34, and the first check hole 20 and the second check hole 22 for checking the liquid level indications 31, 35 provided on the respective tanks 30, 34 will be described below.

The first on-vehicle liquid tank 30 is a reserve tank which is connected to, for example, a running motor and a first cooling route (not shown) for cooling the battery and for temporarily storing a cooling liquid flowing through the first cooling route. The second on-vehicle liquid tank 34 is a reserve tank which is connected to a second cooling route (not shown) for cooling, for example, an ECU and a DC-DC converter and for temporarily storing a cooling liquid flowing through the second cooling route.

The liquid level indications 31, 35 for detecting the stored liquid amount are respectively provided on the outer surfaces of the first on-vehicle liquid tank 30 and the second on-vehicle liquid tank 34 on the side of the charging port 13. Specifically, the liquid level indication 31 on the first on-vehicle liquid tank 30 includes an upper limit line L1 which shows an allowable upper limit of the liquid amount and a lower limit line L2 which shows an allowable lower limit, and characters "MAX" are shown on the line L1 and characters "MIN" are shown on the line L2. The liquid level indication 35 on the second on-vehicle liquid tank 34 includes an upper limit line L3 which shows an allowable upper limit of the liquid amount and a lower limit line L4 which shows an allowable lower limit, and characters "FULL" are indicated on the side of the line L3 and characters "LOW" are indicated on the side of the line L4. Each of the on-vehicle liquid tanks 30, 34 are made of translucent resin and has optical transparency, so that a positional relationship between the inside liquid level and the lines L1, L2, L3, L4 indicating allowable upper and lower limits can be observed.

In addition, inside the charging port 13, the first check hole 20 for checking the liquid level indication 31 on the first on-vehicle liquid tank 30 and the second check hole 22 for checking the liquid level indication 35 on the second on-vehicle liquid tank 34 are opened. For example, the first check hole 20 is a rectangular hole which is formed to penetrate in the vehicle width direction at an upper end of a step portion of the charging port 13 and at an upper side of the charging inlet 50. The second check hole 22 is a rectangular hole which is formed to penetrate in the vehicle width direction at the upper end of a rear side end of the step portion and at a rear side of the charging inlet 50. In the first check hole 20 and the second check hole 22 of FIG. 4, the on-vehicle liquid tanks 30, 34 to be checked are shown as dotted area.

Figure 5:
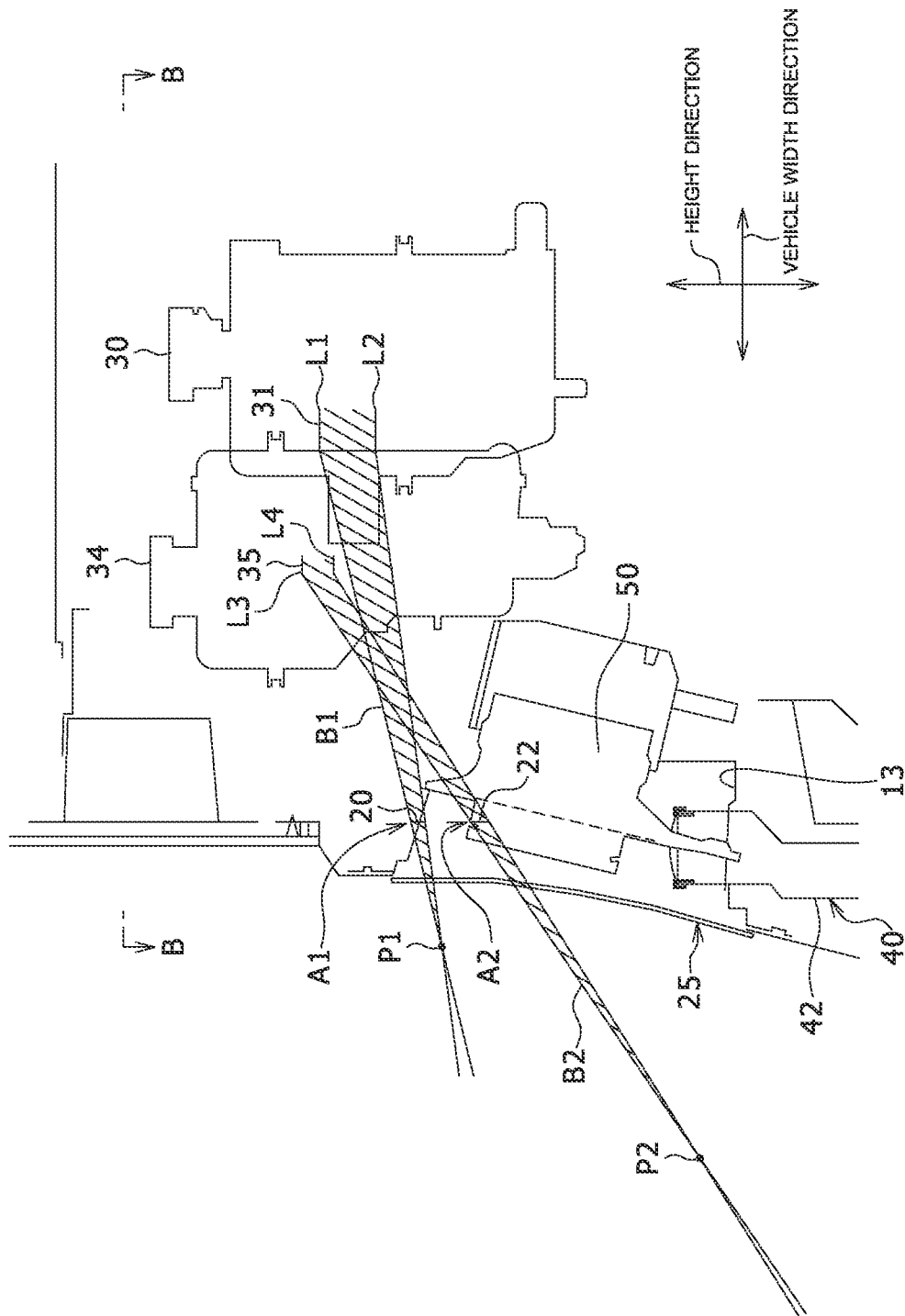
FIG. 5 is a cross sectional view along line A-A of FIG. 4.
Figure 6:
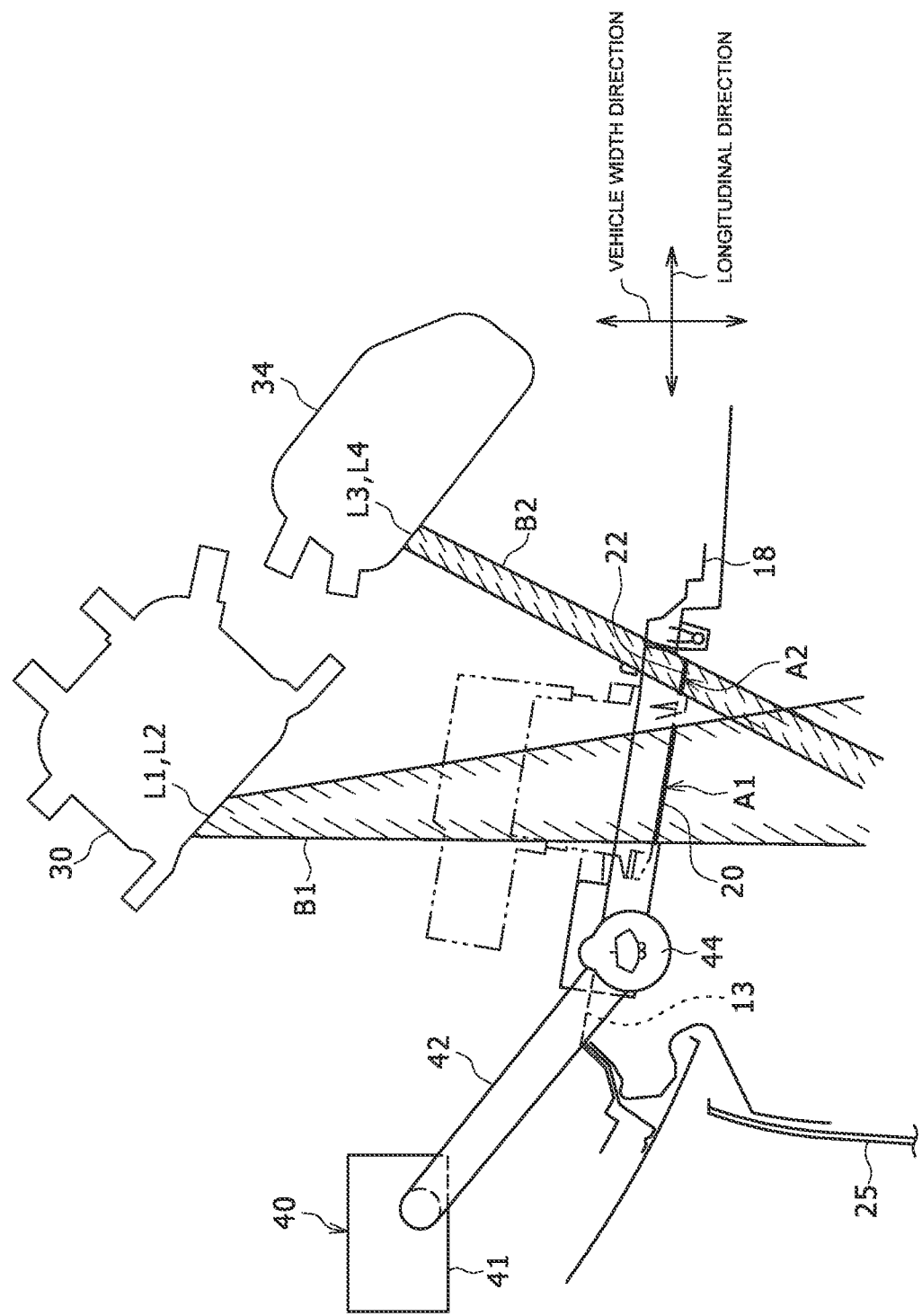
FIG. 6 is a cross sectional view along line B-B of FIG. 5.

FIG. 5 is a cross sectional view along line A-A of FIG. 4. FIG. 6 is a cross sectional view along line B-B of FIG. 5. The first check hole 20 is opened inside the charging port 13 as a part of a first unobstructed-view passage B1 (oblique-lined area passing through point P1 of FIG. 5) which leads the liquid level indication 31 on the first on-vehicle liquid tank 30 to the charging port 13. In FIG. 5 and FIG. 6, the position of the first check hole 20 is shown by a thick line part indicated by an arrow A1.

The second check hole 22 is opened inside the charging port 13 as a part of a second unobstructed-view passage B2 (oblique-lined area passing through a point P2 of FIG. 5) which leads the liquid level indication 35 on the second on-vehicle liquid tank 34 to the charging port 13. In FIG. 5 and FIG. 6, the position of the second check hole 22 is shown by a thick line part indicated by an arrow A2. In FIG. 5, it is assumed for simplification of the figure that the second on-vehicle liquid tank 34 is positioned in the same longitudinal direction as the first on-vehicle liquid tank 30. The inspection worker can check the liquid level indication 31 on the first on-vehicle liquid tank 30 through the first check hole 20 from outside of the charging port 13 and can also check the liquid level indication 35 on the second on-vehicle liquid tank 34 through the second check hole 22 from outside of the charging port 13.

The first unobstructed-view passage may be appropriate if it leads the liquid level indication 31 on the first on-vehicle liquid tank 30 to the charging port 13. At this time, as shown in FIG. 5, the first unobstructed-view passage may be the first unobstructed-view passage B1 for leading the liquid level indication 31, which includes the whole range of the line L1 to the line L2 in a vertical direction, to the charging port 13.

The ranges of the first unobstructed-view passage B1 and the second unobstructed-view passage B2 in the longitudinal direction are defined as indicated by the oblique-lined areas in FIG. 6. The range of each of the unobstructed-view passages B1, B2 in the longitudinal direction is a range that both ends of the lines L1, L2 (or the lines L3, L4) in the longitudinal direction can be viewed on the outer surfaces of the respective tanks 30, 34. It is acceptable that the inspection worker's visual point is outside the charging port 13 within the oblique-lined area indicating the unobstructed-view passages B1, B2 of FIG. 6 with respect to the longitudinal direction.

As to the position of the inspection worker's visual point in the vertical direction, the inspection worker can use the first unobstructed-view passage B1 shown in, for example, FIG. 5, FIG. 6 to set the inspection worker's visual point outside the charging port 13 of the oblique-lined area showing the point P1 of FIG. 5 or the first unobstructed-view passage B1 of FIG. 5. At this time, the inspection worker can see thoroughly the range of the line L1 to the line L2 in the vertical direction of the liquid level indication 31 from outside the charging port 13 through the first check hole 20. Accordingly, the inspection worker can check whether the liquid amount in the first on-vehicle liquid tank 30 is appropriate or whether the liquid level is in the range of the line L1 to the line L2.

Figure 7:
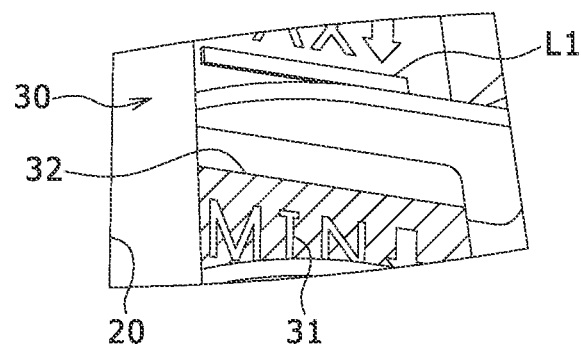
FIG. 7 is a perspective view showing a state that a liquid level indication on a first on-vehicle liquid tank is seen through a first check hole from the charging port.

FIG. 7 is a perspective view showing a state that the liquid level indication 31 on the first on-vehicle liquid tank 30 is seen from the charging port 13 through the first check hole 20. As shown in FIG. 7, the inspection worker can also check that the liquid amount in the first on-vehicle liquid tank 30 is appropriate by checking that a liquid level 32 is below the line L1 and above the line L2 not seen in FIG. 7.

The second unobstructed-view passage B2 is appropriate if it leads the liquid level indication 35 on the second on-vehicle liquid tank 34 to the charging port 13, and it may be configured to lead the liquid level indication including the whole range from the line L3 to the line L4 to the charging port with respect to the vertical direction.

For example, using the second unobstructed-view passage B2 shown in FIG. 5, FIG. 6, the inspection worker sets a visual point outside the charging port 13 of the oblique-lined area showing the point P2 of FIG. 5 or the second unobstructed-view passage B2 of FIG. 5 and can see thoroughly the range of the line L3 to the line L4 in the vertical direction of the liquid level indication 35 through the second check hole 22 from outside the charging port 13. Accordingly, the inspection worker can check whether the liquid amount in the second on-vehicle liquid tank 34 is appropriate; namely, whether the liquid level is in the range of the line L3 to the line L4.

Figure 8:
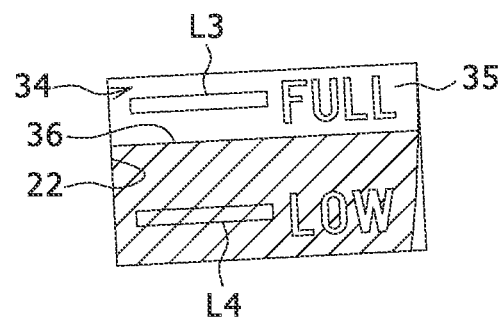
FIG. 8 is a perspective view showing a state that a liquid level indication on a second on-vehicle liquid tank is seen through a second check hole from the charging port.

FIG. 8 is a perspective view showing a state that the liquid level indication 35 on the second on-vehicle liquid tank 34 is seen from the charging port 13 through the second check hole 22. As shown in FIG. 8, the inspection worker can check that the liquid amount in the second on-vehicle liquid tank 34 is appropriate by checking that the liquid level 36 is between the line L3 and the line L4.

As described above, the electric motor vehicle 10 is provided with the first and second on-vehicle liquid tanks 30, 34 which are arranged in the vicinity of the charging port 13 and provided with the liquid level indications 31, 35 of the stored liquid amount, and the first and second check holes 20, 22 for checking the liquid level indications 31, 35 are opened inside the charging port 13. Accordingly, the liquid amount inspection work can also be performed easily when the charging work is performed, so that a burden on the inspection worker can be reduced as described later.

Each of the first on-vehicle liquid tank 30 and the second on-vehicle liquid tank 34 can be replenished with the liquid through an opening 101 (FIG. 2) provided inside the vehicle cabin. The opening 101 is normally closed by a closing member (not shown), and the closing member is removed to replenish the liquid. The liquid amount in each of the tanks 30, 34 can be inspected through the opening 101, but for the liquid amount inspection, it is necessary to remove the closing member for closing the opening 101 in the vehicle cabin. Therefore, the burden of the inspection work may be increased. According to the configuration of the present embodiment, when the battery charging work is performed, the liquid amount in each of the on-vehicle liquid tanks 30, 34 can also be inspected with the charging lid 25 opened. Thus, the burden on the inspection worker can be reduced.

The first on-vehicle liquid tank 30 and the second on-vehicle liquid tank 34 are arranged in the equipment arrangement space 100. Therefore, the liquid level indications 31, 35 might be dark when they are seen through each of the check holes 20, 22. In such a case, the inspection worker uses a light such as a portable flashlight to illuminate the liquid level indications through each of the check holes 20, 22, so that the liquid level indications 31, 35 can be brightened. In addition, the position of each of the on-vehicle liquid tanks 30, 34 may be restricted so that the distance from each of the check holes 20, 22 to each of the liquid level indications 31, 35 on the respective on-vehicle liquid tanks 30, 34 becomes within 300 mm or within 150 mm; that is, a distance at which the liquid level indications 31, 35 are readily visible through the check holes 20, 22.

Next, the on-vehicle liquid tank 40 with the gauge pipe and the third check hole 24 for checking the liquid level indication 47 (FIG. 9) provided on the on-vehicle liquid tank 40 with the gauge pipe will be described. The on-vehicle liquid tank 40 with the gauge pipe is a reserve tank which temporarily stores a washing liquid and is connected to a washing liquid route for jetting out the washing liquid (washer liquid) as an on-vehicle liquid to a windshield glass, for example. As shown in FIG. 2, the on-vehicle liquid tank 40 with the gauge pipe is arranged below but in the vicinity of the charging port 13. The on-vehicle liquid tank 40 with the gauge pipe includes a main body container 41 for storing an on-vehicle liquid and a gauge pipe 42 which accommodates a level gauge 46 (FIG. 9) for detecting the stored liquid amount. The level gauge 46 has its lower end housed in the main body container 41. The gauge pipe 42 extends toward the charging port 13 and its upper end is pulled out into the charging port 13 from the third check hole 24 which is formed in a wall portion at a lower end of the charging port 13. The upper end opening of the gauge pipe 42 is openably closed by a cap 44.

Figure 9:
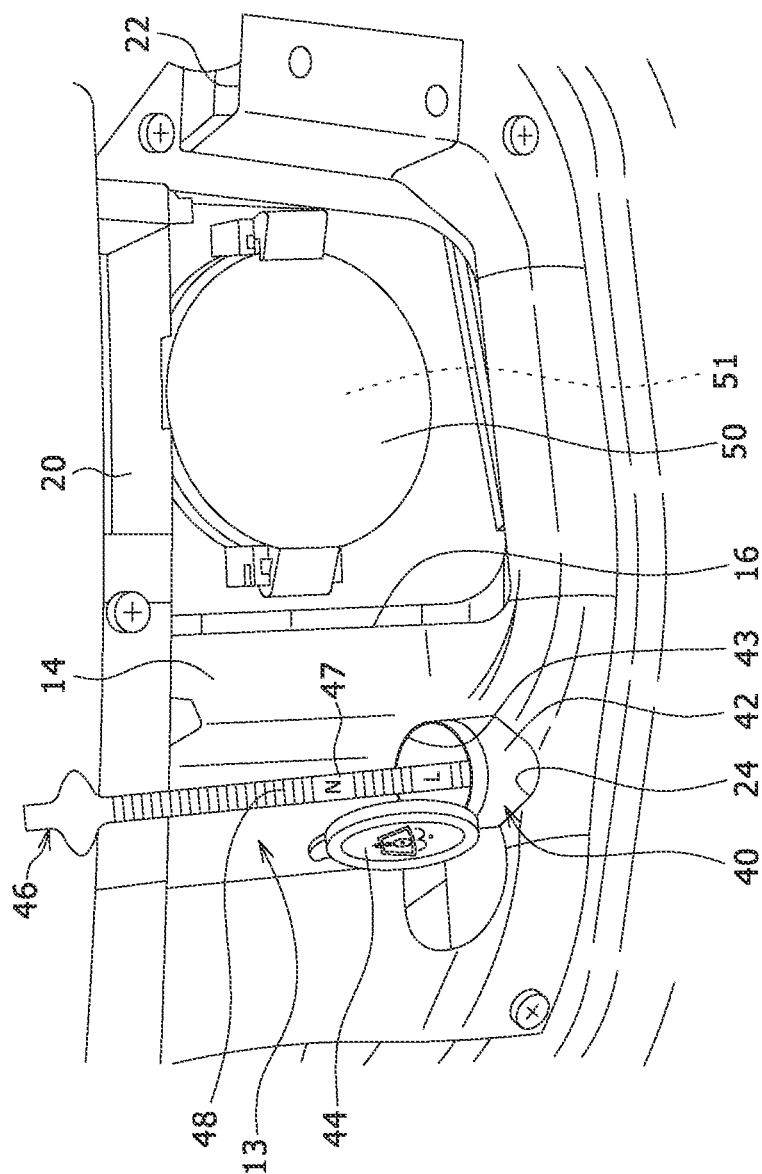
FIG. 9 is a view corresponding to FIG. 3 showing a state that a level gauge is pulled out from the upper end of an on-vehicle liquid tank with a gauge pipe which is pulled out to the inner side of the charging port.

As shown in FIG. 9, the level gauge 46 is provided thereon with the liquid level indication 47 which has a character "N" or "NORMAL" indicating a reference position of the liquid amount, a character "L" or "LOW" indicating an allowable lower limit, and a plurality of scales. The liquid level indication 47 may be formed to have a character indicating an allowable upper limit and a character indicating an allowable lower limit. To check the liquid amount, the charging lid 25 is opened, and as shown in FIG. 9, the inspection worker removes the cap 44 from the upper end of the gauge pipe 42 to expose an upper end opening 43 of the gauge pipe 42 inside the charging port 13. Then, the level gauge 46 is pulled out from the upper end opening 43. Thus, the liquid amount is detected by checking whether or not the liquid amount in the on-vehicle liquid tank 40 with the gauge pipe is appropriate according to the positional relationship between the position L of the liquid level indication 47 and the liquid level 48. As described above, the electric motor vehicle 10 is provided with the on-vehicle liquid tank 40 with the gauge pipe, which is arranged in the vicinity of the charging port 13 and has the liquid level indication 47 of the stored liquid amount, and the third check hole 24 for checking the liquid level indication is opened inside the charging port 13. Accordingly, the liquid amount inspection work can be performed easily at the same time as the charging work as described later, and the burden on the inspection worker can be reduced.

The above-described electric motor vehicle 10 is provided with the respective on-vehicle liquid tanks 30, 34, 40 which are arranged in the vicinity of the charging port 13 and is also provided with the liquid level indications 31, 35, 47 of the stored liquid amounts, and the respective check holes 20, 22, 24 are opened inside the charging port 13 in order to check the liquid level indications. Accordingly, when the charging lid 25 is opened to perform charging, the inspection worker can use the check holes 20, 22, 24 which are opened inside the charging port 13 to check the liquid level indications provided on the on-vehicle liquid tanks 30, 34, 40. Thus, the liquid amount inspection work can be performed easily when the charging work is performed, and the burden on the inspection worker can be reduced.

In addition, each of the first and second check holes 20, 22 is opened as part of the unobstructed-view passages B1, B2 inside the charging port 13 to lead the liquid level indications 31, 35 on the respective first and second on-vehicle liquid tanks 30, 34 to the charging port 13. Accordingly, when the inspection worker opens the charging lid 25, the worker can check the liquid level indications 31, 35 by merely viewing the liquid level indications 31, 35 on the on-vehicle liquid tanks 30, 34 through the check holes 20, 22 opened within the charging port 13. Therefore, a burden on the inspection worker can be reduced further.

Furthermore, the on-vehicle liquid tank 40 with the gauge pipe is arranged below the charging port 13 and accommodates therein the level gauge 46 having the liquid level indication 47. Also, the upper end of the gauge pipe 42, which is led out of the upper side of the on-vehicle liquid tank 40 with the gauge pipe, is pulled out from the third check hole 24. Accordingly, since the on-vehicle liquid tank 40 is arranged below the charging port 13, even if an opening is formed inside the charging port 13, it is hard to check the outer surface of the on-vehicle liquid tank from the opening. Then, the liquid level indication 47 can be checked by pulling out the level gauge 46 from inside the upper end portion of the gauge pipe 42 which is pulled out from inside the third check hole 24 which is opened inside the charging port 13. Therefore, a degree of freedom in arrangement of the on-vehicle liquid tank 40 with the gauge pipe can be improved.

In the above configuration, it was described that the electric motor vehicle is provided with the three on-vehicle liquid tanks 30, 34, 40, and the check holes 20, 22, 24 for checking the liquid level indications which are provided on the respective on-vehicle liquid tanks 30, 34, 40 were opened inside the charging port 13. However, the present disclosure is not limited to the above, but it may also be configured such that the electric motor vehicle is provided with one or two selected from among the three on-vehicle liquid tanks 30, 34, 40, and the check holes for checking the liquid level indications provided on one or two on-vehicle liquid tanks are opened inside the charging port 13.

The invention claimed is:

1. An electric motor vehicle comprising:
 a charging port which is opened in a vehicle side portion and opened/closed by a charging lid;
 a charging inlet which is arranged inside the charging port and has a connection unit connectable to an outside power source; and
 an on-vehicle liquid tank which is arranged in a vicinity of the charging port and provided with a liquid level indication of a stored liquid amount, wherein:
 the charging port has therein a check hole which is opened to view a side of the on-vehicle liquid tank to check the liquid level indication.

2. The electric motor vehicle according to claim 1, wherein the check hole is opened inside the charging port as a part of an unobstructed-view passage which leads the liquid level indication to the charging port.

* * * * *